US009021588B2

(12) United States Patent
Falk et al.

(10) Patent No.: US 9,021,588 B2
(45) Date of Patent: Apr. 28, 2015

(54) METHOD FOR PROCESSING MESSAGES IN A COMMUNICATION NETWORK COMPRISING A PLURALITY OF NETWORK NODES

(75) Inventors: Rainer Falk, Poing (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 5 days.

(21) Appl. No.: 13/821,467

(22) PCT Filed: Aug. 16, 2011

(86) PCT No.: PCT/EP2011/064109
§ 371 (c)(1),
(2), (4) Date: Mar. 7, 2013

(87) PCT Pub. No.: WO2012/031861
PCT Pub. Date: Mar. 15, 2012

(65) Prior Publication Data
US 2013/0167234 A1 Jun. 27, 2013

(30) Foreign Application Priority Data

Sep. 9, 2010 (DE) .......................... 10 2010 044 858

(51) Int. Cl.
G06F 11/00 (2006.01)
H04L 29/06 (2006.01)
G06F 21/64 (2013.01)
H04L 1/24 (2006.01)
H04L 9/32 (2006.01)

(52) U.S. Cl.
CPC ................ *H04L 63/12* (2013.01); *G06F 21/64* (2013.01); *H04L 1/24* (2013.01); *H04L 9/3242* (2013.01)

(58) Field of Classification Search
CPC ............ H04L 63/1416; H04L 63/1408; H04L 63/1441
USPC .............................................. 726/23
See application file for complete search history.

(56) References Cited

U.S. PATENT DOCUMENTS 5,568,380 A 10/1996 Brodnax et al.
6,772,334 B1 * 8/2004 Glawitsch ..................... 713/153
7,353,394 B2 4/2008 Marmigere et al.
(Continued)

FOREIGN PATENT DOCUMENTS

CN 1536914 10/2004
DE 102007040094 A1 2/2009
(Continued)

*Primary Examiner* — Teshome Hailu
(74) *Attorney, Agent, or Firm* — Cozen O'Connor (57) ABSTRACT

A method for processing messages in a communication network, wherein messages are transmitted between network nodes of the communication network, which are each combined with test information that is verifiable to determine whether a corresponding message is admissible, where an admissible message leads to a positive test result and an inadmissible message leads to a negative test result. For at least one message that is provided for a respective network node, an action coupled to the message is performed from the respective network node in time a message is received in the respective network node without checking the test information combined with the message, wherein, upon execution of the action, the test information is verified by the respective network node and, when the test result is negative, at least one predefined measure is performed.

21 Claims, 3 Drawing Sheets

(56) References Cited

U.S. PATENT DOCUMENTS

| | | | |
|---|---|---|---|
| 7,458,095 B2 * | 11/2008 | Forsberg | 726/3 |
| 8,356,178 B2 * | 1/2013 | Hars | 713/170 |
| 2002/0010874 A1 | 1/2002 | Barthel | |
| 2003/0076847 A1 | 4/2003 | Chu | |
| 2005/0160052 A1 | 7/2005 | Schneider et al. | |
| 2007/0192863 A1 * | 8/2007 | Kapoor et al. | 726/23 |
| 2009/0133121 A1 | 5/2009 | Falk et al. | |
| 2010/0161958 A1 | 6/2010 | Cho et al. | |

FOREIGN PATENT DOCUMENTS

| | | |
|---|---|---|
| DE | 102007053255 | 5/2009 |
| DE | 102008009691 | 8/2009 |
| DE | 10 2007 040 094 B4 | 2/2010 |
| EP | 1615370 | 1/2006 |
| KR | 100749846 | 8/2007 |

\* cited by examiner

METHOD FOR PROCESSING MESSAGES IN A COMMUNICATION NETWORK COMPRISING A PLURALITY OF NETWORK NODES

CROSS-REFERENCE TO RELATED APPLICATIONS

This is a U.S. national stage of application No. PCT/EP2011/064109 filed 16 Aug. 2011. Priority is claimed on German Application No. 10 2010 044 858.3 filed 9 Sep. 2010, the content of which is incorporated herein by reference in its entirety.

BACKGROUND OF THE INVENTION

1. Field of the Invention

The invention relates to a method for processing messages in a communication network comprising a plurality of network nodes, and to a corresponding communication network and a corresponding network node.

2. Description of the Related Art

It is known to provide test information for messages transmitted in a communication network. For example, by means of a CRC (cyclic redundancy check) it is possible to determine whether the data of a message has been changed during transmission as a result of transmission errors. It is also known to provide cryptographic checksums for messages, where is it possible for these checksums to be generated using a hidden input. By this means, it can be ensured that only the message which possesses the cryptographic hidden input can generate a verifiable checksum. By this means, it is possible to counteract the unauthorized transmission of messages in a communication network. By means of the cryptographic checksums, it is also possible to determine whether unauthorized manipulation of the message by an attacker has occurred.

Although the use of test information during the transmission of messages in a communication network enables effective protection against attacks, it has the disadvantage that, in order to verify the test information, it is normally necessary to perform time-consuming cryptographic operations that delay the continuing processing of the message. This is of relevance in communication networks for automation systems in particular, in which commands, or control instructions, are given to networked devices of the automation system via the messages. These commands are often time-critical, i.e., they may only be executed with a slight delay, as otherwise malfunctions in the operation of the automation system can occur.

A method for reversing a configuration change coupled to proof of authorization and executed in a control device is described in the published document DE 10 2007 040 094 B4. This method enables the configuration change to be reversed if the authorization message is subsequently countermanded.

A method for processing messages in a message processing device, where a priority with regard to the security check of the corresponding message is defined based on the content of that message, is described in the published document DE 10 2007 053 255 A1.

SUMMARY OF THE INVENTION

It is an object of the invention to provide a method for processing messages in a communication network in which the respective messages are protected by test information and yet are still processed rapidly in the communication network.

This and other objects and advantages are achieved in accordance with the invention by a method, a communication network and network nodes wherein the communication network is preferably the communication network of an automation system, which serves to process messages in a communication network consisting of several network nodes. In this use scenario, the individual network nodes constitute components of the automation system which, during operation of the system, perform functions within the process automated by the system. In such cases, the network nodes constitute, in particular, control devices, sensors, actors, interconnected switches (e.g., Ethernet switches) and suchlike. The automation system in such cases can be a system for the automation of processes or for the automation of production. The automation system can also be a system for the automation of buildings or the automation of energy.

In a step a) of the method according to the invention, messages are transmitted between network nodes of the communication network that are each combined with test information which can be verified to determine whether the corresponding message is admissible. In such cases, a message is then admissible if it leads to a positive test result. If it does not, the message is classed as inadmissible. The concept of admissibility should be'understood in the broad sense and can be coupled to any desired criteria that can be suitably defined. For example, a message can be admissible if it can be positively verified based on test information in the form of a checksum, or if proof of authorization (e.g., a certificate) that is coupled to the message can be successfully verified.

The method according to the invention is characterized in that in a step b), for one or more messages out of a quantity of messages that are provided, or intended, for a respective network node of at least a portion of the network nodes, an action coupled to the message is performed from the respective network node, each time that a message is received in the respective network node, without checking the test information that is combined with the message, where, upon execution of the action, the test information is verified by the respective network node and, when the test result is negative, one or more predefined measures are performed. A message is thus linked with a predefined action, with the concept of action being understood in the broad sense here, and in particular comprising an individual action step or a series of several action steps. In a preferred embodiment, the message constitutes a corresponding command that can be executed by the respective network node. If the method according to the invention is used in a communication network of an automation system the messages are preferably commands comprising control instructions for the execution of steps executed by the automation system.

Identification of the above features as step a) and step b) is only for the purpose of simplifying reference to them and is not intended to indicate the order in which the steps are to be executed.

The method according to the invention is based on the idea that most messages transmitted in a communication network are admissible and lead to a positive test result when the test information is verified. As a result, the actions coupled to the messages are provisionally rapidly executed without verification of the test information, but with appropriate measures being defined in the event that the message turns out to be inadmissible upon execution of the action. These measures serve in particular to protect the communication network from inadmissible messages. In the simplest of cases, a measure can constitute the issuing of a warning message so that a user of the communication network is made aware of inadmissible messages and can initiate appropriate further steps.

In a particularly preferred embodiment, the test information that is combined with a corresponding message comprises an appropriate checksum, which is generated taking account of the message, it being possible, when the checksum is verified, to ascertain whether the message has been changed, and for a changed message to constitute an inadmissible message. The checksum here can, for example, be a CRC checksum with which it is possible to establish the integrity of the message. The checksum is preferably a cryptographic checksum, such cryptographic checksum being generated using a cryptographic hidden input, i.e., using a symmetrical and/or asymmetrical cryptographic method. Any desired methods known from the prior art can be used to generate such checksums, in particular those based on cryptographic hash functions such as SHA-1, MD5, HMAC-SHA1, HMAC-MD5 and AES-CBC-MAC. It is also possible to generate the checksum based on signatures with suitable signature algorithms, such as RSA, DSA or EC-DSA.

Where applicable, the test information can also comprise proof of authorization, i.e., in the form of a certificate, by which it can be checked whether the message has been transmitted by an authorized party. The message is then an admissible message if the proof of authorization can be successfully verified when the test information is checked. Unlike with the above checksums, the proof of authorization can be generated without taking account of the data contained in the message.

In a further particularly preferred embodiment of the method according to the invention, restore information is stored in the particular network node via which the action performed in step b) can be reversed. The restore information can, for example, be derived from the message when the action coupled to the message is performed. It is also possible for the restore information to be contained in the message already. In the event of a negative test result in step b), the restore information serves to reverse the action coupled to the message, with this reversal constituting an embodiment of a predefined measure that is performed in the event of a negative test result.

When the method is used in a communication network of an automation system the predefined measure or measures comprise, in particular, an emergency stop, and/or the operation in emergency mode, of one or more components of the automation system.

Step b) of the method according to the invention can, where applicable, be performed in all cases, i.e., upon receipt of every message in the respective network node for which the message is provided. It is, however, also possible for step b) to be performed only for messages that fulfill one or more criteria, with the test information of any messages which do not fulfill the criterion or criteria being checked first and the action coupled to any such messages subsequently being performed only if the test result is positive. It is thus possible to determine, in a manner appropriate to the respective use case, for which messages the action coupled to them should provisionally be performed without verification of the test information. In a preferred embodiment, the messages are classed as time-critical or not time-critical, with a criterion to be fulfilled by a message being that the message is critical. This means that if the action coupled to the message is classed as time-critical and to be performed rapidly, the message is classed as time-critical and is further processed without verification of the test information.

When the method according to the invention is used in a communication network of an automation system the messages can also be classed as critical to the operation of the automation system or not critical to the operation of the automation system. In particular, a message is critical here if the action coupled to it is capable of leading to major damage to the automation system or to prolonged downtime of the automation system. In such cases, a criterion to be fulfilled by the message is that it is not critical to the operation of the automation system, i.e., the actions coupled to messages that are not critical are performed immediately, without verification of the test information, whereas critical messages are only further processed after positive verification of the test information.

In a further embodiment of the method according to the invention, a criterion to be fulfilled by a message of which the action coupled to it changes one or more parameters in corresponding network nodes is that the change in at least one of the parameters is less than a predefined amount, or is not above the predefined amount. This means that if the parameters only change slightly the message is provisionally processed further, and the action coupled to it is performed without taking account of the test information. It is assumed here that parameters in a corresponding network node only move within a certain value range during normal operation. It is therefore highly probable that messages with parameter changes within this value range have not been manipulated, so the actions coupled to such messages can provisionally be performed without verification of the test information.

The embodiment just described of the method according to the invention is also preferably implemented in a communication network of an automation system. The parameter or parameters here are one or more correcting variables that can be changed in the respective network node and relate to a process executed by the automation system, such as flow rates of liquids or gases, valve settings, motor speeds or pressures.

In a further embodiment of the method according to the invention, one criterion to be fulfilled by the message, as a result of which the action coupled to the message is performed without the test information being verified, is that an identical or similar message was received in the respective network node within a predefined period of time in the past and executed on the basis of step b), with the verification of the test information of this identical or similar message having also led to a positive test result. In the presently contemplated embodiment, the benefit derives from the knowledge that the parameters in consecutive messages in certain use scenarios, for example, in a communication network of an automation system, normally change only slowly, so a slight change in the parameters of the message indicates a message that has not been changed or manipulated and which can be processed first, without verification of the test information. The criteria when a message is classed as similar to another message can then be determined in a manner appropriate to the use case. For example, a message can be classed as similar to an earlier message if the message parameters have changed by no more than 5%.

In addition to the method described above, the invention also comprises a communication network with a multiplicity of network nodes, it being possible for the network nodes to be configured such that the method according to the invention, or one or more embodiments of the method according to the invention, can be implemented in the communication network.

The invention also relates to a network node for use in such a communication network, the network node being configured such that, when in operation in the communication network according to the invention, the network node performs the action coupled to one or more messages out of a quantity of messages that are provided for it, each time that a message is received and without checking the test information combined with the message, where also it is possible for the network node to verify the test information after the action has been performed and, in the event of a negative test result, either to initiate the implementation of one or more predefined measures or to perform them itself.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described in detail below with the aid of the attached figures, in which.

DETAILED DESCRIPTION OF THE PREFERRED EMBODIMENTS

Figure 1:
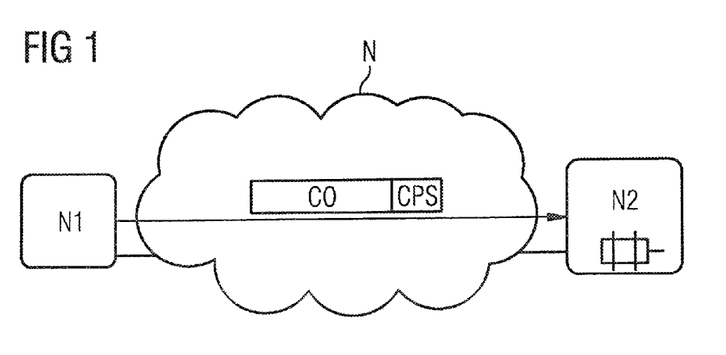
FIG. 1 shows a schematic representation of the transmission of a command in an embodiment of the method according to the invention.

The method according to the invention is described below in relation to communication networks in automation systems in which the individual network nodes are components of the automation system that can communicate with one another via a corresponding network. FIG. 1 shows such a communication network N, in which two network nodes N1 and N2 communicate with one another. These network nodes constitute corresponding devices of an automation system, where network node N1 is a control device, and network node N2 is a device controlled by the control device. The control device can, for example, be a programmable logic controller that is linked via the network to the controlled device, such as a motor or a valve, a sensor, depending on the configuration of the automation system. The network N can, for example, be an Ethernet network, in particular one based on Industrial Ethernet. The network can also be configured as an IP network, a mobile communications network, a WLAN or similar. Any desired configuration of the automation system networked by means of the communication network N is also possible. In particular, it can be a system for the automation of processes or for the automation of production. The system can, where applicable, also be a system for the automation of buildings or the automation of energy.

When the system is in operation, messages in the form of commands are exchanged between the network nodes, or devices, and by way of example such a command is designated by the reference sign CO in FIG. 1. This command is transmitted to the controlled device N2 by the control device N1 and gives the controlled device corresponding instructions to execute. For protection against manipulation by attackers, in the embodiment described here, all commands CO are provided with an appropriate checksum, which is signified by CPS and attached to the command CO in FIG. 1. In the embodiment described below the checksum is a cryptographic checksum, for example in the form of a message authentication code (MAC), with which the authenticity of the command CO can be verified via a cryptographic hidden input.

Symmetrical or asymmetrical methods for generating the checksum can be used. In symmetrical methods, the same secret key is available to the control device N1 and the controlled device N2. The checksum in such cases has been generated using the command CO and the secret key, and can be verified in the controlled device N2 using with the secret key. It is also possible for an asymmetrical method to be used, in which the checksum is generated in the control device N1 using a private key and is verified in the controlled device using a public key. It is possible to detect manipulations in the commands CO using the cryptographic checksums described above, as the command itself is used in the generation and verification of the checksum, so that when the command changes the checksum can no longer be positively verified. In addition, an attacker without knowledge of the appropriate (private) key is unable to calculate valid cryptographic checksums and thus cannot feed commands into the network.

With the cryptographic checksums described above efficient protection of communication within an automation system is assured. It has, however, proved to be disadvantageous that cryptographic operations involving time-consuming calculations, which can cause considerable delays in the operation of the automation system, are required to verify the checksum. These delays are no longer acceptable for certain particularly time-critical commands. In order to avoid such delays, in the embodiments described below the execution of certain predefined commands is initiated by the respective network node as soon as it receives such commands, without verification of the checksum. The checksum is only verified subsequently and, in the event of a negative test result, appropriate countermeasures are carried out, with the command that was executed preferably being reversed. This is achieved using appropriate restore or rollback information that is stored in the network node when the appropriate command is executed.

Figure 2:
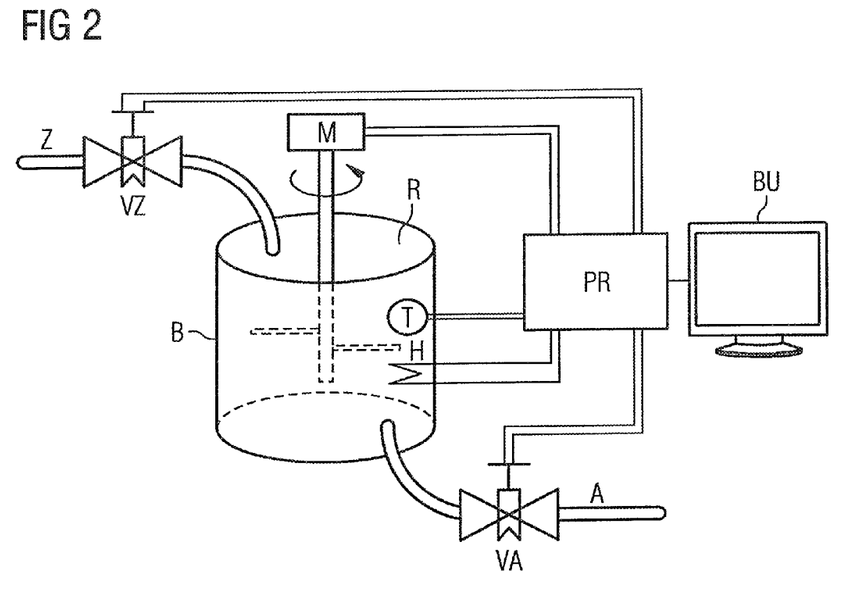
FIG. 2 shows a schematic representation of a process plant in which commands based on the method according to the invention are processed.

FIG. 2 is a schematic representation of an example of an automation system in the form of a process plant in which the commands can be processed based on the method according to the invention. When the plant shown is in operation, a liquid is introduced into a container in which the liquid is stirred. The container in FIG. 2 is designated by the reference sign B, it being possible for the liquid to flow into the container B via an inlet Z that can be opened or closed as appropriate by a valve VZ. A stirrer R that is driven via a corresponding motor M is provided in the container, and stirs the liquid in the container. A temperature probe T and a heating element H are also provided in the container. During stirring, the liquid is heated to a predefined temperature by the heating element. After execution of the stirring process the liquid is drained via a drain A with a corresponding valve VA and, where applicable, fed to further stations in the automation system. The process of stirring is controlled by a process control computer PR, which in turn receives control commands from a control and monitoring unit BU. The process control computer PR here is connected to the other components of the automation system, i.e. the inlet valve Z, the drain valve VA, the heating element H, the temperature probe T and the motor M. The components just mentioned, together with the process control computer PR and the control and monitoring unit BU, constitute appropriately intercommunicating network nodes.

In the process represented in FIG. 2 commands, or control instructions, are transmitted from the control and monitoring unit to the process control computer PR as well as from the process control computer PR to the motor M, the valves VZ and VA and the heating element H. The transmission of a temperature value from the temperature probe T to the process control computer PR can also be interpreted as such a command, as the process control computer PR executes a control action on the basis of the temperature value, in order to heat the liquid to a predefined temperature or to keep it at that temperature. Communication between the components in the scenario in FIG. 2 can, for example, be via a field bus such as, for example, HART or PROFIBUS, or via a communications network based on Ethernet or IP.

Figure 3:
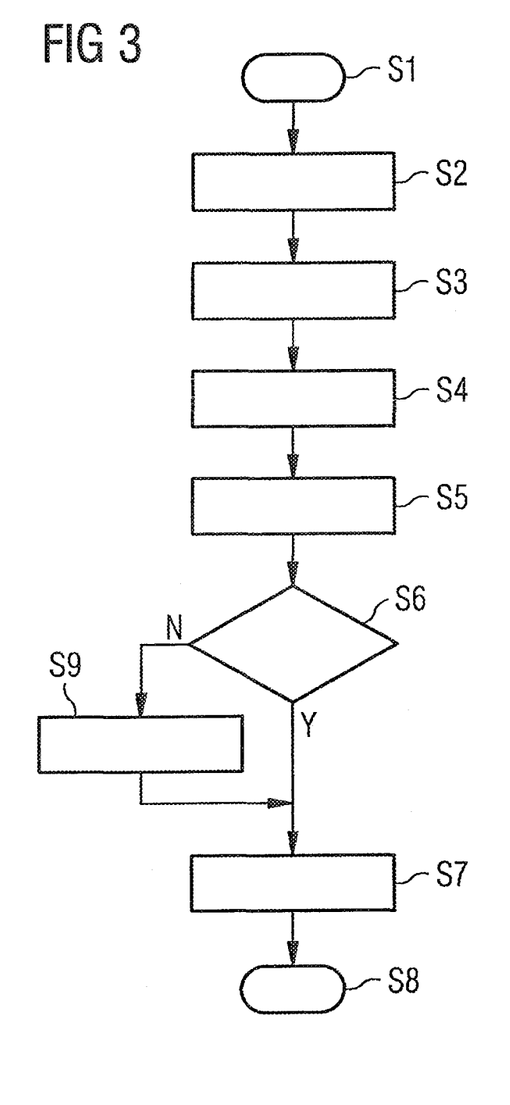
FIG. 3 shows a diagram depicting execution of an embodiment of the method according to the invention.

FIG. 3 below illustrates an embodiment of a method according to the invention in which each control instruction received in a network node is executed first, regardless of its content, and its checksum is only verified subsequently. A network node here can, for example, be a component of the process plant represented in FIG. 2.

The start of the method is designated by step S1. In step S2 a control instruction is received by a corresponding network node, with the network node deriving and storing rollback information from the control instruction in step S3. On the basis of this rollback information, it is possible to reverse an executed control instruction. The rollback information can, where appropriate, also be encoded directly in the control instruction. The control instruction is then executed in step S4; for example, the speed of a motor is changed or corresponding valves opened or shut. Only after the control instruction has been executed is the cryptographic checksum of the control instruction verified, in step S5. In step S6 it is determined whether the checksum is valid or not. If the checksum is valid (branch Y from step S6) the rollback information stored previously in step S3 is deleted in step S7 and the method is completed in step S8. If, on the other hand, the cryptographic checksum is not valid (branch N from step S6) the control instruction is reversed in step S9 on the basis of the rollback information, so that the status of the respective network node before the control instruction was executed is restored. The control instruction is then deleted, again in step S7, and the method is completed in step S8.

With the embodiment of the method represented in FIG. 3, efficient operation of the respective automation system is achieved without time-consuming delays caused by verification of the cryptographic checksum. It is assumed here that attacks from third parties are normally infrequent and that in most cases execution of the corresponding control instruction was admissible. In the rare cases in which the checksum of the control instruction cannot be verified, appropriate rollback information is used to ensure that the status of the automation system before the control instruction was executed is restored.

Figure 4:
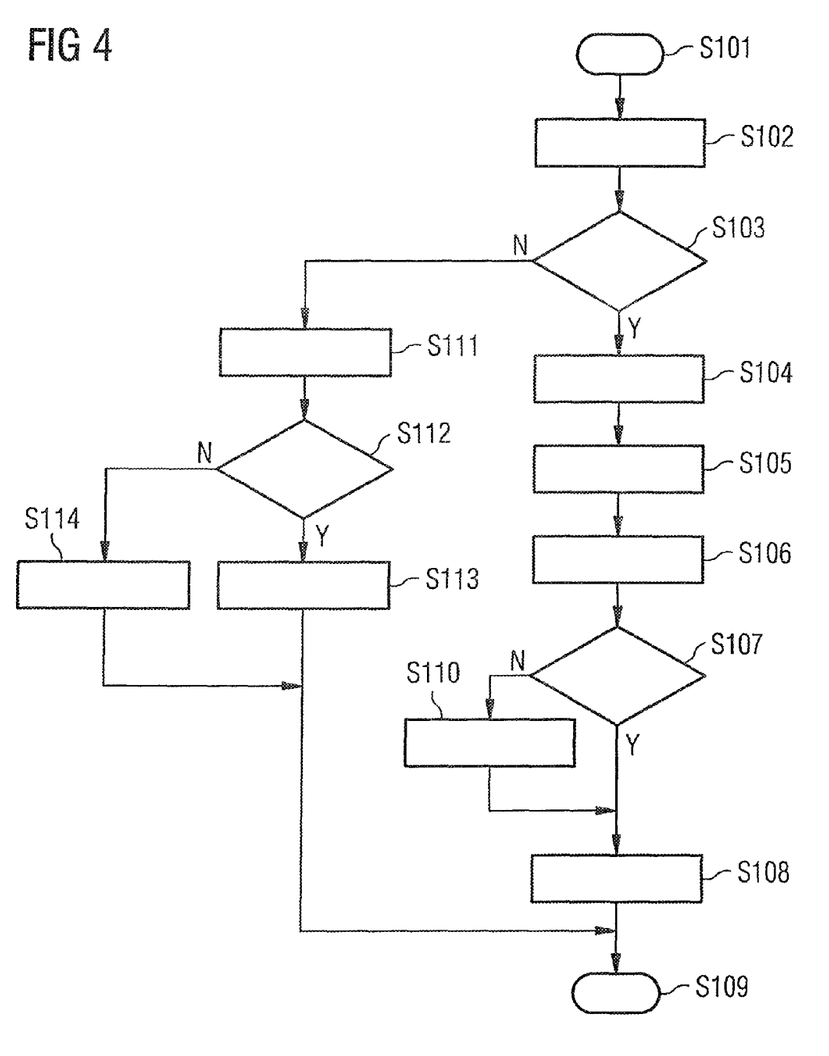
FIG. 4 shows a diagram depicting the execution of a further embodiment of the method according to the invention.

FIG. 4 shows another embodiment of the method according to the invention in which the checksum is only verified for predefined control instructions that are executed without prior verification of the checksum. In such cases predefined criteria are defined, according to which control instructions are specified to the effect that they are either to be executed first, without verification of checksums, or only after the checksum has been verified. For example, a control instruction to switch off a motor in the automation system can provisionally be executed without verification of the checksum, whereas a control instruction to switch on the motor should be executed only after the checksum has been verified. This is because the process of switching off a motor is more time-critical, as it might be a case of, for example, an emergency switch-off due to irregularities. In a further example, a control instruction that changes a required speed, pressure, flow rate or suchlike within a predefined value range can be provisionally executed without verification of the checksum. Also, a control instruction can, for example, only be executed without verification of the checksum if an identical or similar control instruction with a valid cryptographic checksum has been received within a defined period of time in the past. A "similar control instruction" should be understood here as a control instruction with only a slight change in its parameters, for example, of less than 5%. As a result, the fact that the parameters of control instructions in an automation process only change slowly is taken into account, so it can be assumed that a control instruction of which the parameters are only slightly different compared to previous control instructions has not been manipulated.

The start of the method in FIG. 4 is indicated by step S101. In step S102, a control instruction is received in a corresponding network node. Unlike in the embodiment shown in FIG. 3, in step S103 the network node first checks what kind of control instruction it is. If the control instruction is one that is executed without verification of the cryptographic checksum (branch Y from step S103), in step S104 appropriate rollback information is derived from the control instruction and stored. The control instruction is then executed in step S105, and the cryptographic checksum of the control instruction is only checked in step S106. If in step S107 it is then found that the cryptographic checksum is valid (branch Y from S107), the rollback information stored previously is deleted in step S108 and the method completed in step S109. If, on the other hand, the cryptographic test information is invalid (branch N from S107), the control instruction is reversed in step S110 based on the rollback information, the rollback information is then deleted, again in step S108, and the method completed in step S109.

If in the above step S103 it is found that the control instruction is an instruction that is only to be executed after the cryptographic checksum has been positively verified (branch N from S103), the cryptographic checksum is verified first, in step S111. If in step S112 it is then found that the checksum is valid (branch Y from step S112) the control instruction is executed in step S113 and the method then completed in step S109. If, on the other hand, it is found in step S112 that the cryptographic checksum is invalid (branch N from step S112), the control instruction is rejected in step S114 and the method then completed in step S109.

The embodiments described above of the method according to the invention have several advantages. In particular, at least some control instructions that are not critical to the operation of an automation system can be executed without the additional delay caused by verification of a cryptographic checksum. As a result, delays are avoided, and any undesired effects are limited to the time that elapses before the cryptographic checksum is verified. In this way, downtimes during the performance of normal functions are reduced, allowing better general behavior of the system to be achieved with regard to stability and control dynamics.

While there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for processing messages in a communication network of an automation system comprising a plurality of network nodes, the method comprising the steps of:
   transmitting messages between network nodes of the plurality of network nodes of the communication network of the automation system which are each combined with test information which is verifiable to determine whether a corresponding message is admissible, an admissible message leading to a positive test result and an inadmissible message leading to a negative test result; and
   performing an action coupled to the message without verification of the test information from the respective network node that is combined with the message for at least one message out of a quantity of messages which are provided for a respective network node of the plurality of network nodes, of at least a portion of the plurality of network nodes, in each case when a message is received in the respective network node of the plurality of network nodes, the test information being verified by the respective network node of the plurality of network nodes upon execution of the action and at least one predefined measure is performed when the test result is negative.

2. The method as claimed in claim 1, wherein at least some of the messages are control instructions for execution of steps by corresponding network nodes of the plurality of the network nodes during a process executed by the automation system.

3. The method as claimed in claim 2, wherein the test information comprises a checksum which is generated based on the message; wherein, when the checksum is verified, it is possible to determine whether the message has been changed; and
   wherein a changed message is an inadmissible message.

4. The method as claimed in claim 1, wherein the test information comprises a checksum which is generated based on the message; wherein, when the checksum is verified, it is possible to determine whether the message has been changed; and
   wherein a changed message is an inadmissible message.

5. The method as claimed in claim 4, wherein the checksum is at least one of a CRC checksum and a cryptographic checksum; and wherein the cryptographic checksum is generated using a cryptographic hidden input.

6. The method as claimed in claim 5, wherein the cryptographic hidden input is at least one of a symmetrical and asymmetrical cryptographic method.

7. The method as claimed in claim 1, wherein the test information comprises proof of authorization, in particular a certificate; and wherein the message is an admissible message if the proof of authorization can be positively verified when the test information is verified.

8. The method as claimed in claim 7, wherein the proof of authorization comprises a certificate.

9. The method as claimed in claim 1, wherein restore information is stored in a particular network node of the plurality of network nodes via which the action performed during said step of performing the action is reversible; and wherein the at least one predefined measure in an event of a negative test result in said step of performing the action comprises a reversal of the action performed based on restore information.

10. The method as claimed in claim 1, wherein the at least one predefined measure in an event of a negative test result in said step of performing the action comprises a warning message.

11. The method as claimed in claim 1, wherein the at least one predefined measure comprises at least one of an emergency stop and operation in an emergency mode of at least one component of the automation system.

12. The method as claimed in claim 1, wherein said step of performing the action is performed for messages that fulfill at least one criteria; and wherein, for messages which do not fulfill the at least one criteria the test information of the message is initially checked and an action coupled to the message is then only performed in an event of a positive test result.

13. The method as claimed in claim 12, wherein the messages are classed as time-critical or not time-critical; wherein a criterion to be fulfilled by a message is that the message is time-critical.

14. The method as claimed in claim 13, wherein the messages are classed as critical to operation of the automation system or not critical to the operation of the automation system; and wherein a criterion to be fulfilled by the message is that the message is not critical to the operation of the automation system.

15. The method as claimed in claim 12, wherein the messages are classed as critical to operation of the automation system or not critical to the operation of the automation system; and wherein a criterion to be fulfilled by the message is that the message is not critical to the operation of the automation system.

16. The method as claimed in claim 12, wherein for a message of which an action coupled to the message changes at least one parameter in the respective network node of the plurality of network nodes, a criterion to be fulfilled is that one of a change in at least one of the parameters is less than a predefined amount and the change in at least one of the parameters is not above the predefined amount.

17. The method as claimed in claim 16, wherein the at least one parameter is at least one correcting variable which is changeable in the respective network node of the plurality of network nodes and relates to a process executed by the automation system.

18. The method as claimed in claim 12, wherein a criterion to be fulfilled by the message is that an identical or similar message was received in the respective network node of the plurality of network nodes within a predefined period in the past and was processed based on said step of performing the action; and wherein the verification of the test information of the identical or similar message also led to a positive test result.

19. A communication network of an automation system comprising a plurality of network nodes, wherein each of the plurality of network nodes of the communication network is configured to:
   transmit messages between network nodes of the plurality of network nodes of the communication network of the automation system which are each combined with test information which is verifiable to determine whether a corresponding message is admissible, an admissible message leading to a positive test result and an inadmissible message leading to a negative test result; and
   perform an action coupled to the message without verification of the test information from the respective network node that is combined with the message for at least one message out of a quantity of messages which are provided for a respective network node of the plurality of network nodes, of at least a portion of the plurality of network nodes, in each case when a message is received in the respective network node of the plurality of network nodes, the test information being verified by the respective network node of the plurality of network nodes upon execution of the action and at least one predefined measure is performed when the test result is negative.

20. The communication network as claimed in claim 19, wherein the communication network of the automation system is configured such that at least some of the messages are control instructions for execution of steps by corresponding network nodes of the plurality of the network nodes during a process executed by the automation system.

21. A network node for implementation in a communication network of an automation system comprising a plurality of network nodes, wherein each network node of the plurality of network nodes is configured such that, when in operation in the communication network of the automation system, each network node performs an action coupled to at least one message out of a plurality of messages that are provided for each respective network node, in each case when a message is received, without checking the test information combined with the message; and wherein each network node verifies the test information after the action has been performed and, in an event of a negative test result, initiates implementation of at least one predefined measure.

* * * * *